No. 628,337. Patented July 4, 1899.
W. & P. KRYSZEWSKI.
DOUGH MIXER.
(Application filed Apr. 25, 1899.)
(No Model.) 2 Sheets—Sheet 1.

WITNESSES:
INVENTORS
Wladyslaw Kryszewski
Peter Kryszewski
BY
ATTORNEYS.

UNITED STATES PATENT OFFICE.

WLADYSLAW KRYSZEWSKI AND PETER KRYSZEWSKI, OF JERSEY CITY, NEW JERSEY.

DOUGH-MIXER.

SPECIFICATION forming part of Letters Patent No. 628,337, dated July 4, 1899.

Application filed April 25, 1899. Serial No. 714,438. (No model.)

*To all whom it may concern:*

Be it known that we, WLADYSLAW KRYSZEWSKI and PETER KRYSZEWSKI, of Jersey City, in the county of Hudson and State of New Jersey, have invented a new and Improved Dough-Mixer, of which the following is a full, clear, and exact description.

Our invention relates to an improvement in devices for mixing dough, the same being adapted for household purposes or of such a size as to take and handle a comparatively small amount of flour.

Our invention consists of novel features, which will be hereinafter described and claimed.

Reference is to be had to the accompanying drawings, forming a part of this specification, in which similar characters of reference indicate corresponding parts in all the views.

Figure 1:
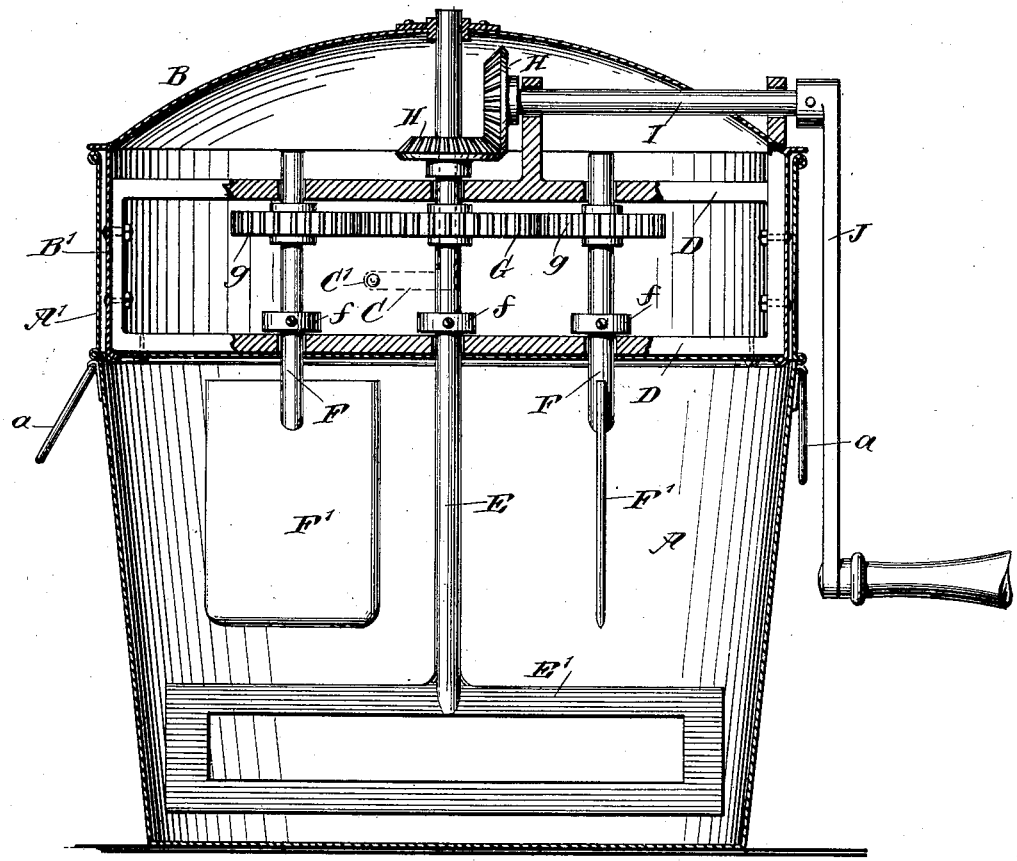
Figure 2:
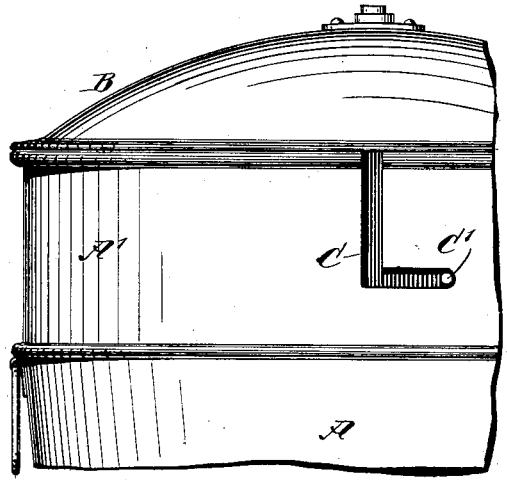
Figure 3:
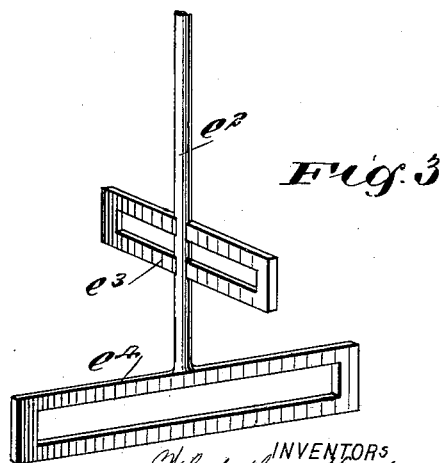
Figure 4:
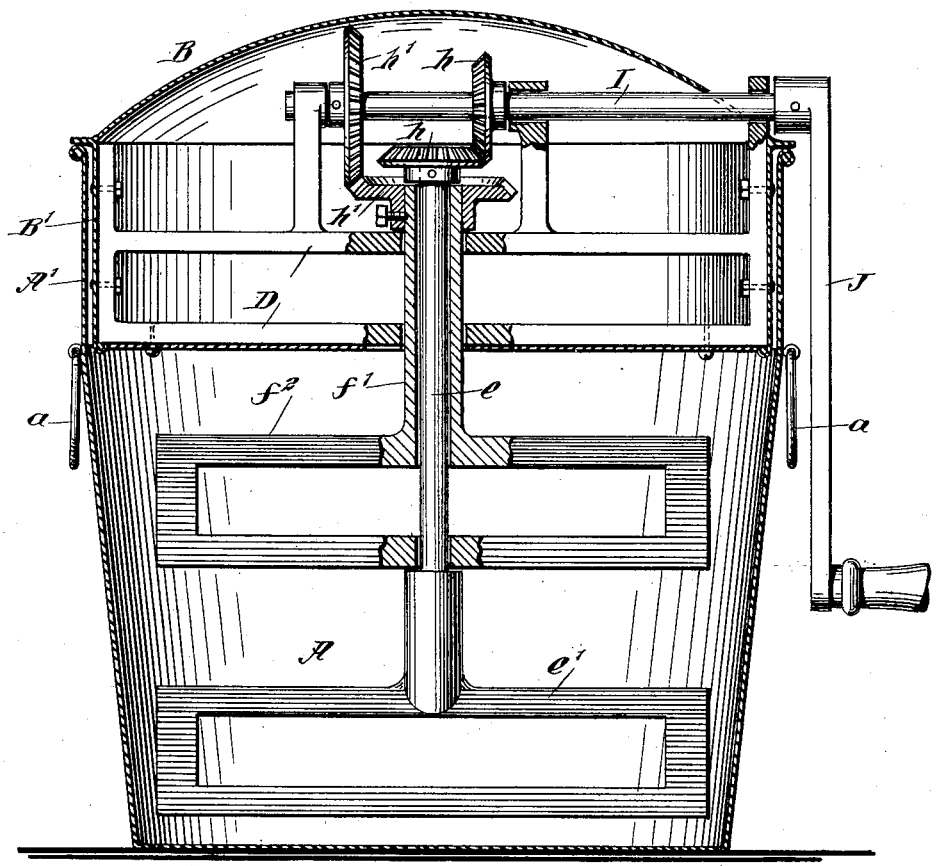

Figure 1 is a sectional elevation of one form of our device. Fig. 2 is a partial elevation showing the bayonet-slot connection between the cover and body of the device. Fig. 3 is a perspective view of a modified form of mixing blades or paddles and the shaft carrying them, and Fig. 4 is a sectional elevation of a modified form of construction of the dough-mixer.

The object of our invention is to provide a device which may be used for mixing dough and which shall be of such a size and simplicity of construction that it may be cheaply made and adapted for household use.

The device is mounted upon a bucket or tub A, which is of such size as to conveniently hold the amount of dough which it is desired to mix at once. This tub or bucket is provided with a removable cover B, which has an interior cavity within which the operating mechanism is placed. This provides a partition between the mechanism by which the blades or paddles are operated and the chamber within which the flour is placed for mixing. The upper portion A' of the tub or bucket is of a cylindrical shape and of such size as to snugly receive the cylindrical portion B' of the cover. This section of the tub is provided with a bayonet-slot C upon each side, and the cover is provided with two pins C', adapted to enter said slots, so that the cover may be securely held in place.

Within the chamber formed in the cover is placed a stiffening-frame D, which is herein shown as consisting of two parallel bars connected at each end and secured to the walls of the cover. Within this frame are journaled three depending shafts E and F F, the shaft E being located centrally of the bucket and the two shafts F being located one upon each side of the center. These shafts are held in position by means of collars $f$, located above the lowermost of the bars D. Above the frame formed by the bars D is a horizontal shaft I, which is journaled in suitable supports and is connected with the central shaft E by means of a set of bevel-gears H. The shaft I extends outside of the cover and is provided at its outer end with a crank J, by means of which the mechanism is operated. The three shafts E and F F are connected with each other by means of a set of gears, the gear G being placed upon the shaft E and the two gears $g$ $g$ upon the two shafts F F. At the lower end of the central shaft E is secured a cross bar or blade E', which extends substantially across the lower end of the bucket at a slight distance above its bottom. This blade is here shown as being formed of two bars connected at each end, thus forming a large opening in the center thereof.

At the lower ends of the shafts F F are secured paddles F' F', which consist of thin rectangular blades. The manner of connecting the shaft E with the two shafts F F insures that the paddles F' F' shall turn in a direction opposite to that of the blade E'.

In using our device the cover is removed and the required amount of flour, together with water and all the materials which are desired to be incorporated in the dough, is added. The cover is then put in place and the crank turned, thus revolving the blades or paddles and thoroughly mixing the materials together. It is thus unnecessary to insert the hands in the dough.

The bucket may be provided with handles $a$, by means of which it may be readily manipulated.

Instead of the three shafts shown in Fig. 1 a central shaft only may be used, as indicated in Fig. 3. This central shaft, which in this figure is lettered $e^2$, may be secured to cross bars or blades $e^3$ $e^4$, located one at a slightly-greater elevation than the other. This will answer the purpose of mixing the dough very well, although not as well as the construction shown in Fig. 1.

In Fig. 4 a modified form of the construction is illustrated, in which two central shafts are shown, one of the shafts $f'$ being hollow and carrying the other shaft $e$ within the same. These shafts are provided with blades or paddles $e'$ and $f^2$ and are revolved by means of two sets of bevel-gears $h$ $h'$, one gear of each set being secured to the horizontal shaft I and the other gears to their respective shafts $e$ and $f'$. As shown in this figure, the driving bevel-gears $h$ $h'$ are placed on the shaft I at opposite sides of the shafts $f'$ $e$, so that the two paddles $e'$ $f^2$ are revolved in opposite directions.

Having thus described our invention, we claim as new and desire to secure by Letters Patent—

1. A dough-mixer comprising a bucket or tub having a removable cover, a central shaft depending from the cover and having a cross bar or blade on its lower end, depending shafts located one at each side of the central shaft, and having blades or paddles on their lower ends but above the blade on the central shaft, intermeshing gears on all the shafts, and a horizontal shaft provided with an external crank, and bevel-gears connecting said shaft with one of the depending shafts, substantially as described.

2. A dough-mixer comprising a bucket or tub having a removable hollow cover providing a chamber for the reception of the operating mechanism, a double bar-frame extending across said cover within the chamber and supporting the operating mechanism, a central depending shaft journaled in said frame and having a cross bar or blade on its lower end, depending shafts also journaled in said frame and located one at each side of the central shaft, a blade or paddle on the lower end of each shaft but above the blade on the central shaft, intermeshing gears on all the shafts, and a horizontal shaft provided with an external crank, and bevel-gears connecting said shaft with one of the depending shafts, substantially as described.

WLADYSLAW KRYSZEWSKI.
PETER KRYSZEWSKI.

Witnesses:
JOHN R. HENNESSEY,
HENRY PLATE.